US006570736B2

United States Patent
Noda (10) Patent No.: US 6,570,736 B2
(45) Date of Patent: May 27, 2003

(54) MAGNETIC DISK DRIVE UNIT AND PRODUCTION METHOD THEREFOR

(75) Inventor: Shunji Noda, Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 09/855,619

(22) Filed: May 16, 2001

(65) Prior Publication Data

US 2001/0043430 A1 Nov. 22, 2001

(30) Foreign Application Priority Data

May 18, 2000 (JP) ........................................ 2000-147015

(51) Int. Cl.[7] .............................................. G11B 17/02
(52) U.S. Cl. ................................ 360/97.01; 360/254.7; 360/264.7
(58) Field of Search ...................... 360/97.01–99.12, 360/254.7, 264.7–264.9

(56) References Cited

U.S. PATENT DOCUMENTS

| 5,034,837 | A | * | 7/1991 | Schmitz | .................... 360/256.2 |
| 5,227,936 | A | * | 7/1993 | Strickler et al. | ......... 360/97.02 |
| 5,243,495 | A | * | 9/1993 | Read et al. | ................. 361/685 |
| 5,414,574 | A | * | 5/1995 | Boutaghou et al. | ...... 360/97.01 |
| 5,587,855 | A | * | 12/1996 | Kim | ........................ 360/97.02 |
| 5,654,847 | A | * | 8/1997 | Yagi et al. | ................ 360/97.02 |
| 6,023,392 | A | * | 2/2000 | Kim | ........................ 360/97.01 |
| 6,385,006 | B1 | * | 5/2002 | Kaczeus et al. | ......... 360/97.01 |
| 6,426,847 | B1 | * | 7/2002 | Dague et al. | ............ 360/97.01 |
| 6,487,039 | B1 | * | 11/2002 | Bernett | .................... 360/97.02 |
| 6,490,123 | B1 | * | 12/2002 | Okunaga et al. | ......... 360/97.01 |

FOREIGN PATENT DOCUMENTS

JP  3-207076  9/1991

* cited by examiner

*Primary Examiner*—Robert S. Tupper
(74) *Attorney, Agent, or Firm*—McGinn & Gibb, PLLC (57) ABSTRACT

A magnetic disk drive unit can is designed for reducing weight, improving impact resistance, improving removing ability, and achieving easiness of assembling and lower a cost in a magnetic disk drive unit. The magnetic disk drive unit includes a spindle motor mounting a magnetic disk, a carriage mounting a magnetic head for recording and reproduction, a park mechanism for placing the magnetic head retracted from the magnetic disk at stand-by state where recording and reproducing are not performed, a single rigid frame mounting the spindle motor, the carriage and the park mechanism thereon for forming an assembly, and a casing housing and fixing the assembly, the casing being formed of an elastically deformable material.

19 Claims, 9 Drawing Sheets

MAGNETIC DISK DRIVE UNIT AND PRODUCTION METHOD THEREFOR

BACKGROUND OF THE INVENTION

1. Field of the Invention

The present invention relates to a magnetic disk drive unit and a production method therefor which is superior in shock resistance, light weight and portability.

2. Description of the Related Art

The conventional magnetic disk drive unit has a construction for enclosing a magnetic disk and a magnetic head for reading and writing information on the magnetic disk, within a metallic body generally called as a base and a cover. Such magnetic disk drive unit may have a construction as illustrated and disclosed in Japanese Unexamined Patent Publication No. Heisei 3-207076. The construction will be shown in FIG. 7.

Figure 7:
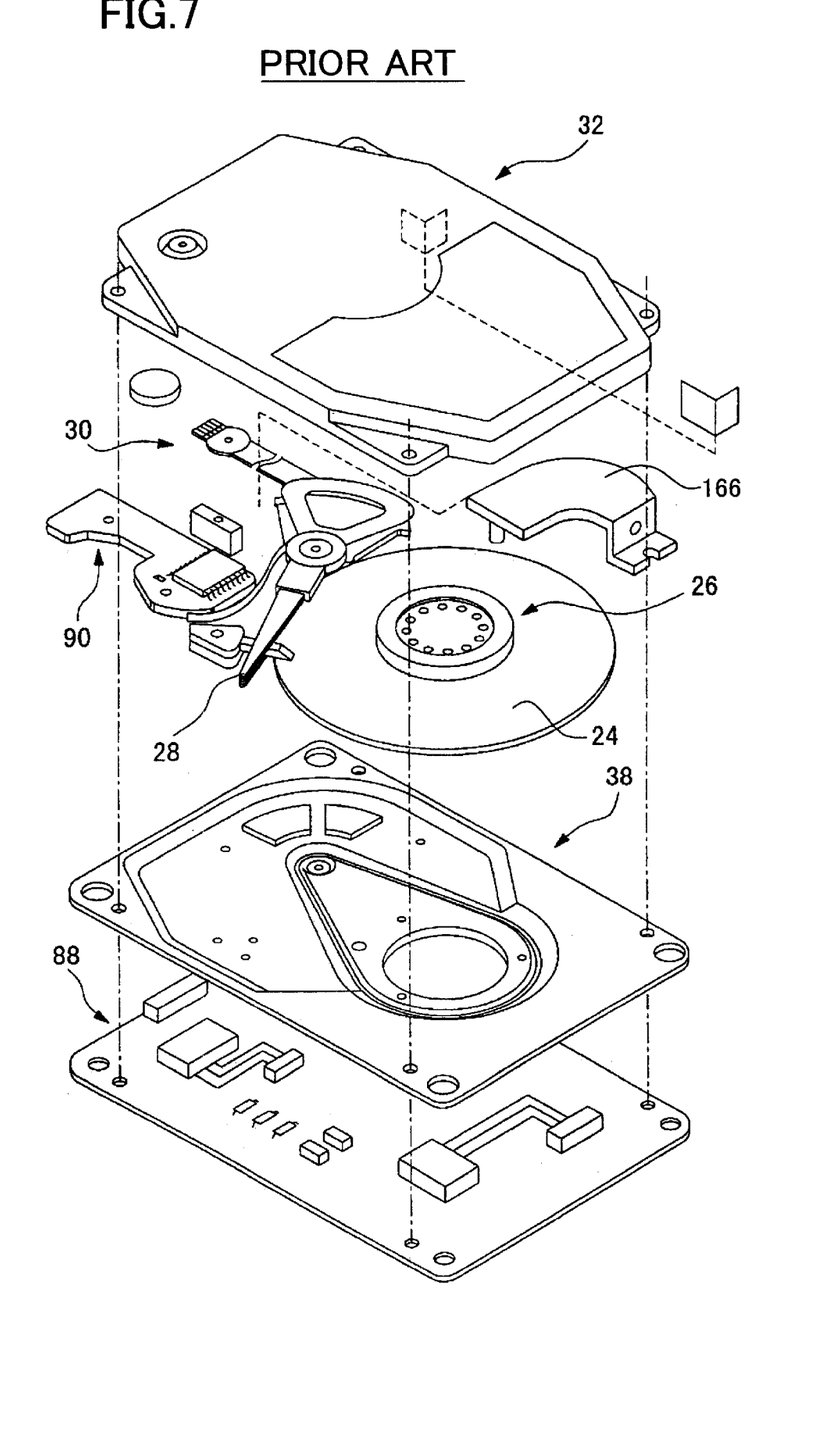
FIG. 7 is an exploded perspective view of the conventional magnetic disk drive unit.

In FIG. 7, a motor 26 with a magnetic disk 24 is secured within a base 38 made of aluminum by means of screws. Then, a carriage 30 mounting a magnetic head 28 is fixed on the base 38 together with a magnetic circuit 166 by screws. In addition, a flexible circuit board 90 is fixed on the base 38 by screws. Finally, a cover 32 is fitted over and fixed by screws. The construction set forth above is a portion referred to as DE (disk enclosure). The DE is completely sealed except for ventilation aperture with a filter in order to prevent penetration of the foreign matter.

As the magnetic disk drive unit, a PCBA (circuit package) 88 is externally fitted on the DE and is connected to the flexible circuit board 90 for inputting and outputting a signal from the magnetic head.

In such magnetic disk drive unit, the base, the cover as well as the carriage and motor are required high precision and rigidity. Therefore, these components are formed of a metal, such as s aluminum, stainless or the like and are designed to provide a thickness as thick as possible.

As a result, in case of the magnetic disk drive unit employing a 3.5 inch disk, a weight becomes 500 g to 1000 g as a whole. The drive is substantially heavy to handle as precise instrument.

On the other hand, upon handling, if falling down of the magnetic disk drive unit is accidentally caused, since the magnetic disk drive unit is covered by metal, an impact is directly transmitted to the major component (carriage, motor and so forth) housed therein.

Here, reason why high precision and rigidity is required and reason why the PCBA is mounted outside of the DE will be discussed briefly.

Concerning the dimensional precision, the magnetic disk drive unit achieves high recording density by floating the magnetic head on the magnetic disk in low floating amount in order of several tens nm. In order to stably maintain low floating amount, a relative height between an arm, on which the magnetic disk is mounted, and the disk surface has to be set strictly. If significant error is caused in the relative height, the magnetic head may be tilted in floating condition, and load to bias the magnetic head toward the magnetic disk may be varied to cause difficulty in maintaining low floating amount. On the other hand, by long period use, damage, such as head crush can be caused.

Therefore, it is generally required to manage an error of relative height between the arm and the disk to be less than or equal to 30 $\mu$m to 50 $\mu$m. In order to realize such tolerance, it is not only required to increase dimensional precision of the carriage and motor but also required high precision for the base mounting the arm and disk. The base is formed of aluminum. Upon manufacturing, the base is formed by aluminum die casting. In case of casting surface of aluminum die casting, it is difficult to achieve surface precision less than or equal to 50 $\mu$m. Therefore, a surface to be a reference for mounting the carriage or motor, re-working is effected to achieve the foregoing precision.

On the other hand, in the magnetic disk drive unit nowadays, a ramp load system, in which the magnetic disk is retracted in a ramp provided outside of the magnetic disk upon stand-by state of the magnetic head, is employed. In this case, it is also required to strictly set the relative height between the ramp and the magnetic disk. The ramp is set above 100 $\mu$m to 200 $\mu$m. Upon loading the magnetic head, the magnetic head is slid on the magnetic disk, and upon unloading the magnetic head, the magnetic head is retracted to the retracted position. Therefore, if the relative height is contains an error, the magnetic head may contact on the disk surface of the magnetic disk upon loading or the magnetic head and the tip end of the ramp may contact to make it impossible to return to the retracted position.

Therefore, it is required to precisely set the height of a base surface on the base to mount the ramp by reworking.

The foregoing relative height relationship may be greater according to increase number of disks for accumulation of tolerance. Furthermore, inclination may also be accumulated to cause difficulty in management for achieving necessary precision.

In the conventional magnetic disk drive unit, the dimensional precision has to be strictly managed by reworking the metallic base.

Next, discussion will be given for demand for high rigidity in the magnetic disk drive unit.

In the recent magnetic disk drive disk unit, recording density is increasing to be higher and higher and a track pitch has reached in the extent of 1 $\mu$m. In order to realize such high recording density, development has been progressed to make fluctuation 3$\sigma$ in positioning precision of the magnetic head to be less than or equal to 50 nm. In such case, resonance design depending upon the base and the arm becomes important. If stiffness of these members is low, resonance can be caused in low frequency range to rise a servo band for positioning of the magnetic head to make impossible to realize high positioning precision. Therefore, by making stiffness of the arm and base as much as possible, designing has been done for shifting resonance point shifted toward higher frequency range.

Finally, reason why the PCBA is mounted outside of the DE is prevention of penetration of dust or other foreign matter within the DE. In the PCBA, a large amount of corrosive elements contained in solder or flux is present. If such element is housed within the DE, corrosion may be caused in the magnetic head and the storage medium. Therefore, a construction is taken to mount the PCBA on the back surface of the DE after completion of assembling of the DE.

As set forth above, in the conventional magnetic disk drive unit, for realizing high performance and high reliability, a construction is taken to cover the DE with a touch base cover and to arrange the PCBA outside of the DE. Therefore, the weight of the whole unit becomes heavy and impact resistance becomes low. Furthermore, electronic parts mounted on the PCBA is exposed to make handling ability of the unit low. At the present, there is not large capacity hard disk drive unit achieving removing ability and portability. In nature, the magnetic disk drive unit is adapted to be used for stationary type unit (desktop type unit), such as workstation, personal computer and the like. For such purpose, the magnetic disk drive unit of the conventional construction has been sufficient.

However, associating with digitizing of video data in nowadays, demand for storage media which can store the video data and is adapted for removable application, has being getting more and more strong. Currently, in this field, as a useful medium, removable recording medium, such as a magnetic tape, DVD and so forth are typically used. However, in case of the magnetic tape, similarly to the existing VHS video recording type magnetic tape, is far lower in versing-up performance and so forth as compared with DVD. On the other hand, DVD currently available merely achieved storage capacity in the extent of 4.7 GB which is not sufficient to record a movie of two hours in high picture quality.

Therefore, in order to solve the problem set forth above, it becomes necessary to develop a large capacity removable medium employing a magnetic disk drive unit.

A simple type removable magnetic disk drive employing a 2.5 inch size magnetic disk has been available. This merely constructed by packing the conventional magnetic disk drive unit in a portable casing and thus is not satisfactory for porting or carrying a large among of data, such as image data, in view point of performance, capacity, cost or the like.

The followings are problem to be solved in for forming portable type magnetic disk drive unit.

First of all, since the magnetic disk drive unit is generally heavy and is not suited for removable magnetic disk drive unit.

The reason is that major components of the conventional magnetic disk drive unit, such as base, cover and so forth are formed of metal. Therefore, if 3.5 inch disk is employed, the weight of the magnetic disk drive unit becomes 500 g to 1000 g to be low in handling ability as portable precise instrument.

Secondly, since the magnetic disk drive unit has low impact resistance, it is not suitable for removable magnetic disk drive unit.

The reason is that cover member, such as base cover of the conventional magnetic disk drive unit covering DE, is all formed of the metal, fastening of such metal members has to be done by screw. Therefore, an impact acting on the magnetic disk drive unit is directly transmitted to the internal major components, such as carriage, motor and the like. Therefore, the internal major components may be easily damaged.

Thirdly, since the electronic parts mounted on the PCBA is exposed, it is not suitable for the removable magnetic disk drive unit.

The reason is that the conventional magnetic disk drive unit is given importance for reliability and thus mounts the PCBA on outside of the DE for preventing penetration of contaminants into the DE.

Fourthly, the magnetic disk driven unit is high in assembling cost.

The reason is that mounting of the carriage, motor and so forth on the base, fastening between the cover and the base and inmost of joints, screws are used. Such construction using the screws inherently cause substantial loading cost upon assembling to make it difficult in automating. Therefore, reducing the screws as much as possible is desirable in view of assembling cost.

SUMMARY OF THE INVENTION

The present invention has been worked out in view of the problems set forth above. Therefore, it is an object of the present invention to reduce weight, improve impact resistance, improve removing ability, easiness of assembling and lower a cost in a magnetic disk drive unit.

According to one aspect of the present invention, a magnetic disk drive unit comprises:
- a spindle motor mounting a magnetic disk;
- a carriage mounting a magnetic head for recording and reproduction;
- a park mechanism for placing the magnetic head retracted from the magnetic disk at stand-by state where recording and reproducing are not performed;
- a single rigid frame mounting the spindle motor, the carriage and the park mechanism thereon for forming an assembly;
- a casing housing and fixing the assembly, the casing being formed of an elastically deformable material.

With the construction set forth above, the major parts including the spindle motor, the carriage and the park mechanism are mounted on the single rigid frame to form one set of assembly and then housed within the elastically deformable casing and is protected by the common rigid frame to achieve high impact resistance, to facilitate assembling and to reduce number of parts for achieving reduction of weight.

The rigid frame is preferably formed into flat, and the spindle motor, the carriage and the park mechanism are mounted on the common magnetic disk drive unit on the same plane of the rigid frame. Also, the rigid frame may be formed from one piece metal plate with die cutting for further reduction of weight.

The rigid frame may form a part of a stator housing of the spindle motor, and thus the rigid frame may be integral with the spindle motor for further down sizing.

The assembly may be formed with the park mechanism is integrally formed with a part of the rigid frame for placing the magnetic head away from the magnetic disk in stand-by state while recording and reproduction is not performed, and whereby the rigid frame body is integral with the park mechanism for achieving further down sizing.

For avoiding electronic parts from externally exposed, a circuit package for controlling the magnetic disk drive unit is preferably housed within the casing.

One of the rigid frame and the casing is formed with a projection and the other is provided a recess or hole for accommodating the projection by elastic deformation of a part of the casing for securing the rigid frame within the casing. With employing such construction, impact force is not easily transmitted to the major parts. Also, by eliminating screw tightening step to lower production cost.

The casing is a molded resin body including a casing body arranged lower side of the assembly and a cover mating with the casing body for entirely covering the assembly, one of the casing body and the cover is provided with a projection and the other is provided with a recess or hole for establishing enclosing condition by engagement of the projection and recess or hole. With employing such construction, impact force is not easily transmitted to the major parts. Also, by eliminating screw tightening step to lower production cost.

The casing is attached a thin conductive member for preventing accumulation of static electric charge. In the alternative, a conductive film is formed on the surface of the casing for preventing accumulation of static electric charge.

According to another aspect of the present invention, a production process of a magnetic disk drive unit comprises the steps of;

forming a flat rigid frame by one of punching press, etching and wire cutting for one piece of plate member;

mounting a spindle motor mounting a magnetic disk, a carriage mounting a magnetic head for recording and reproduction, and a park mechanism for placing the magnetic head retracted from the magnetic disk at stand-by state where recording and reproducing are not performed for forming one set of assembly;

fixing the rigid frame and an elastically deformable casing for covering the rigid frame therewithin by engaging portions thereof; and enclosing the assembly with in the casing.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
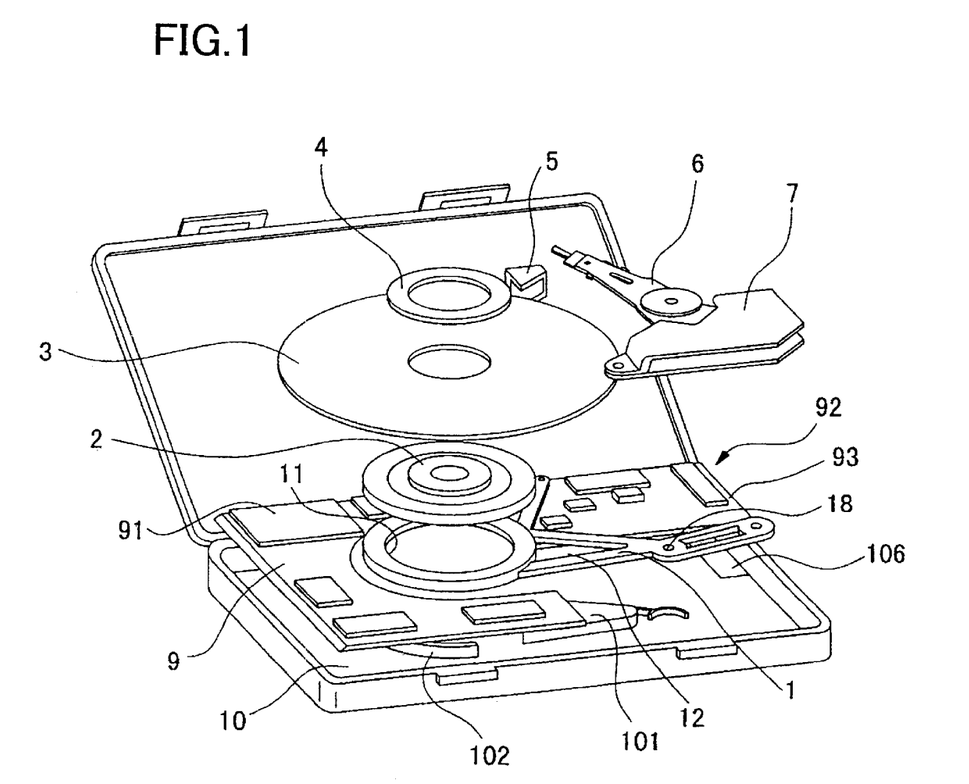
FIG. 1 is an exploded perspective view of the first embodiment of a magnetic disk drive unit according to the present invention.
Figure 2A:
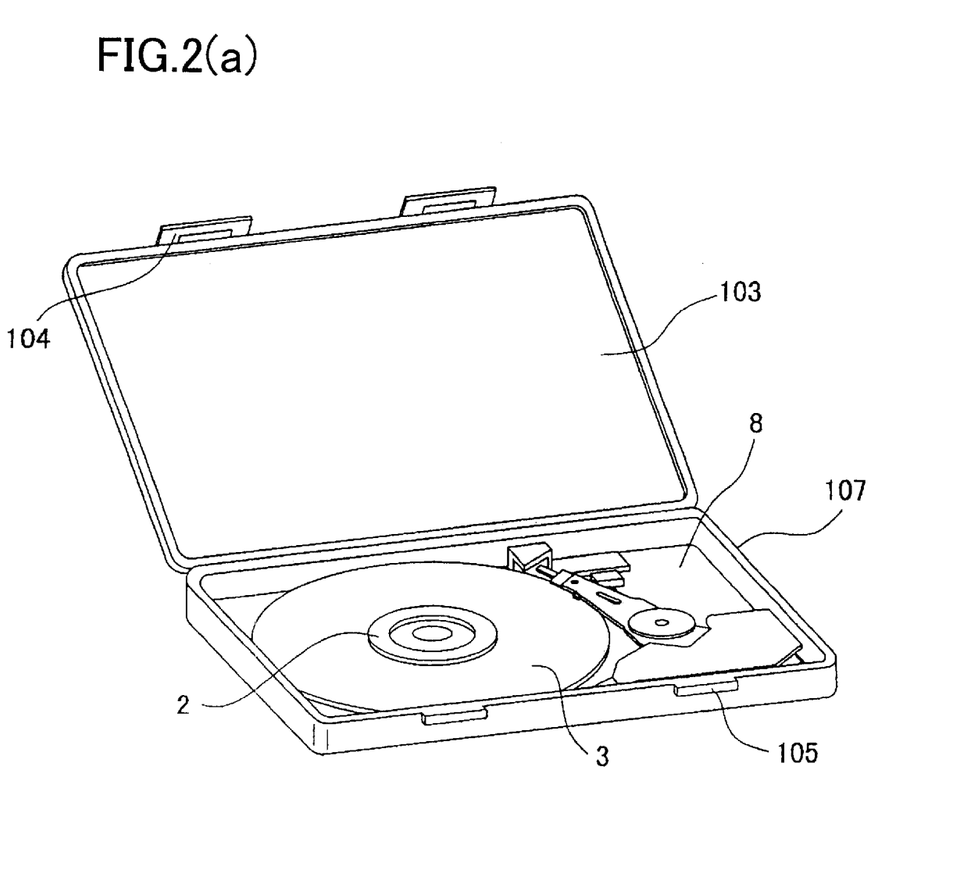
FIG. 2(a) is a perspective view of an overall construction of the magnetic disk drive unit according to the present invention.
Figure 2B:
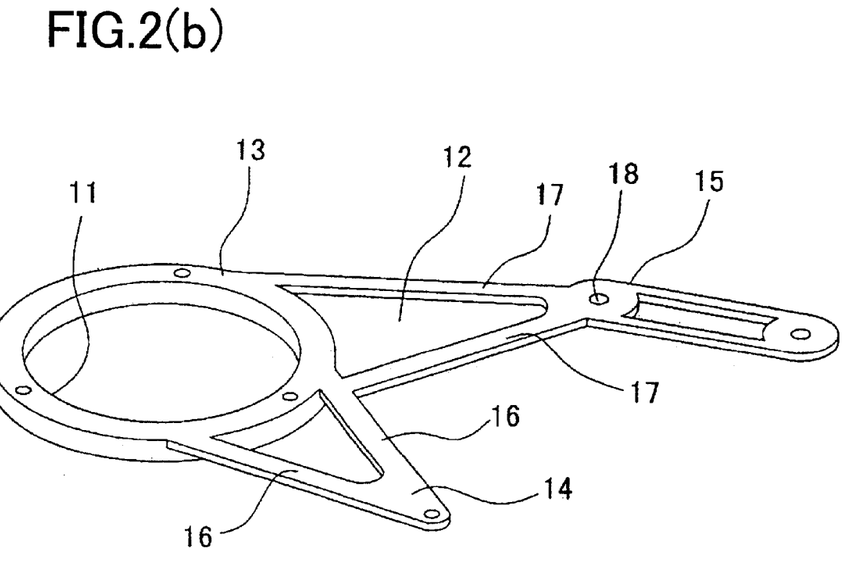
FIG. 2(b) is a perspective view of a frame.

FIG. 1 is an exploded perspective view of the first embodiment of a magnetic disk drive unit according to the present invention, FIG. 2(a) is a perspective view of an overall construction of the magnetic disk drive unit according to the present invention and FIG. 2(b) is a perspective view of a frame.

The magnetic disk drive unit according to the present invention has major parts, such as a spindle motor 2, a carriage 6 and so forth, mounted in a single metallic rigid frame 1. The rigid frame 1 forms a framework of the first embodiment of the magnetic disk drive unit according to the present invention and is provides a measure for sufficiently high structural rigidity. Particularly, in the shown embodiment, a stainless steel of 1 mm thick is used for forming the rigid frame 1. However, the rigid frame 1 may also be formed with an aluminum material, ceramic material, laminated damping steel sheet sandwiching a damping material between steel sheets and so forth. However, since the present invention is intended to reduce weight, the rigid frame 1 is formed as a hollow frame having least foot print area. By employing the shown structure, comparable rigidity as that provided by the base of the conventional magnetic disk drive unit, may e provided for the carriage and the motor.

On the spindle motor 2, a magnetic disk 3 is mounted and is fixed by means of a clamp ring 4. In the shown embodiment of the present invention, the magnetic disk 3 is a 3.5 inch disk and uses only one side for the reason set forth below. Namely, by reducing number of disk, reduction of weight can be achieved. Also, by employing a single side recording specification, cost for parts can be reduced. Furthermore, since the magnetic disk drive unit according to the invention is intended to reduce impact force to be exerted on the spindle motor. The shown embodiment is advantageous in this view point. On the other hand, a reason why employing the 3.5 inch, is to maintain large capacity for achieving advantage as the magnetic disk drive unit even with reduced number of disk.

However, it should be noted that number of disks and size of the disk are not limited to the shown embodiment. Number of disks and size of the disk may be appropriately selected adapting to application of the magnetic disk drive unit.

In the shown embodiment, the clamp ring 4 is employed for fastening the magnetic disk 3. The clamp ring 4 is fixed on the magnetic disk 3 by way of shrink fitting. Shrink fitting is generally employed fitting method and is advantageous in view of lowering of assembling cost, improving flatness of the disk after assembling, improvement of clamping force and so forth.

The magnetic disk 3 fitted on the spindle motor 2 by means of the clamp ring 4 forms a spindle motor-disk assembly. The spindle motor-disk assembly is rigidly secured on the rigid frame by means of screws. The screws are inserted from back side of the motor at three positions. On the other hand, in the rigid frame 1, a through hole 11 for inserting the spindle motor 2, is formed to position coordinates in plane of the spindle motor with reference to a hole diameter.

It should be noted that, in the first embodiment of the present invention, the magnetic disk 3 is set on the spindle motor 2, at first and then the spindle motor-disk assembly is fixed to the rigid frame 1. However, it is also possible to fix the spindle motor 2 on the rigid frame 1 at first, and then set the magnetic disk 3 on the spindle motor 2. In this case, the screws can be inserted from the upper surface of the spindle motor for rigidly securing the spindle motor 2 on the rigid frame 1 and thus can improve workability. On the other hand, without using the screws, the spindle motor 2 can be secured on the rigid frame 1 by way of construction method, such as spot welding and so forth.

In the magnetic disk drive unit according to the present invention, load/unload system is employed for actuation of the magnetic head. In view of improvement for impact resistance, load/unload system is superior than inner periphery CSS (contact start stop) system frequently employed in the conventional 3.5 inch magnetic disk drive unit. For realizing load/unload system, the shown embodiment of the present invention employs a park mechanism for the magnetic head mounted outside of the disk. As the park mechanism, a ramp 5 is employed. The ramp 5 is also fixed on the rigid frame 1.

Detailed discussion for the construction of the rigid frame 1 will be given hereinafter.

In the rigid frame 1, an annular spindle support portion 13 arranged coaxially with the spindle motor 2 and supporting the spindle motor 2, a ramp supporting portion 14 mounting the ramp 5 and a magnetic circuit supporting portion 15 mounting the magnetic circuit 7 are provided. The ramp supporting portion 14 is arranged at an intersection of arms 16 extending outwardly from the spindle supporting portion 13. The magnetic circuit supporting portion 15 is arranged at an intersection of arms 17 extending outwardly from the spindle supporting portion 13.

As a result of such construction, the ramp supporting portion 14 is arranged at a peak of a triangle formed by the spindle supporting portion 13 and the arms 16. The magnetic circuit supporting portion 15 is arranged at a peak of a triangle formed by the spindle supporting portion 13 and the arms 17. Both of the ramp supporting portion 14 and the magnetic circuit supporting portion 15 are accurately positioned relative to the spindle supporting portion 13 with high precision. The rigid frame 1 is a frame-like structural body connecting the spindle supporting portion 13, the ramp supporting portion 14 and the magnetic circuit supporting portion 16 by means of the arms 16 and 17. Furthermore, since the structural body is based on triangle, it achieved sufficient rigidity with light weight. Accordingly, mutual dimensional precision of the spindle supporting portion 13, the ramp supporting portion and the magnetic circuit supporting portion 15 can be enhanced. It should be noted that on inside of the triangle formed by the arms 17, a cut-out portion 12 is formed to be used for mounting on a casing. On the other hand, the rigid frame 1 is formed from a sheet member and a plane to be a reference for mounting the spindle supporting portion 13, the ramp supporting portion 14 and the magnetic circuit supporting portion 15 can be easily positioned on the same plane.

Figure 3:
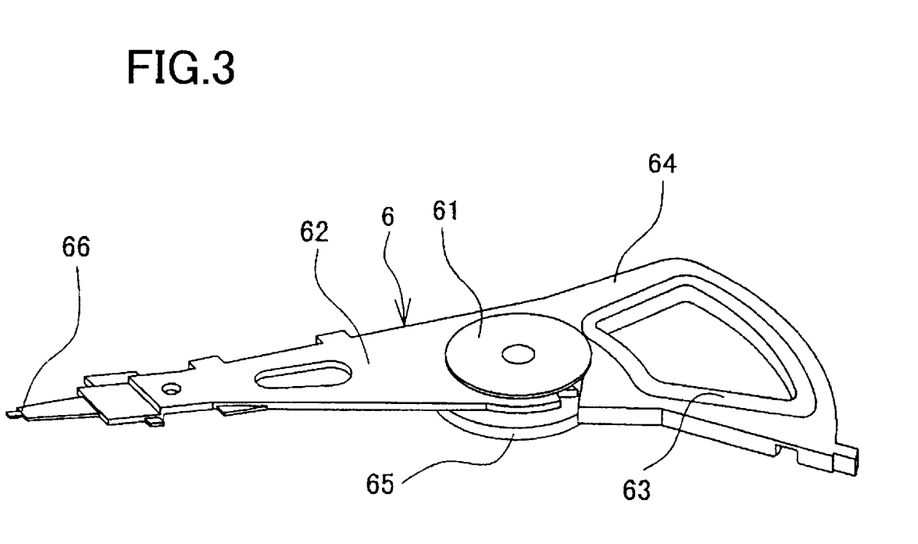
FIG. 3 is a perspective view of a carriage assembly of the first embodiment of the magnetic disk drive unit according to the present invention.

Next, a construction of the carriage 6 is discussed. The carriage 6 is formed as a stack structure as shown in FIG. 3. Namely, an arm 62 mounting a magnetic head 66 and a coil frame 64 mounting a coil 63 are mounted on a unit bearing 61 by means of a nut 65. This system has been originally employed in a large size magnetic disk drive unit. Currently, the stack type carriage is also used in a 2.5 inch magnetic disk drive unit. In the shown embodiment of the present invention, 3.5 inch disk is employed. However, since the disk is single sided specification to mount single magnetic head, the stack type carriage is advantageously employed in view of the manufacturing cost as compared with E block shape arm which is typically employed in the 3.5 inch magnetic disk drive unit.

The carriage 6 thus constructed is fixed at a position of a through hole 18 of the rigid frame 1 for securing the carriage. Fixing of the carriage 6 may be done by preliminarily implanting the male screw by way of pressure fitting in the rigid frame 1 and by inserting the carriage 6 with rotating the unit bearing 61.

Here, in general, securing of the carriage on the base is performed by once setting with placing the magnetic head outside of the ramp member, and then pivoting the magnetic head on the ramp. However, in the magnetic disk driven unit according to the present invention, since a single sided head specification is employed, the magnetic head can be directly lowered onto the ramp to eliminate one process step. On the other hand, while the conventional magnetic disk drive unit is required to provide a wasteful space for once setting the magnetic head out of the ramp, the assembling system according to the present invention does not require the wasteful space.

Figure 4:
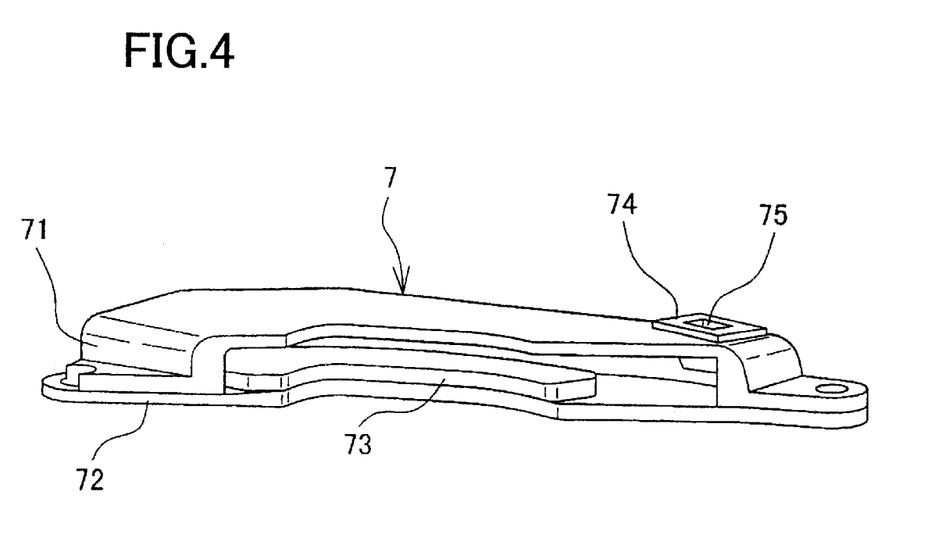
FIG. 4 is a perspective view of the first embodiment of a magnetic circuit assembly of the present invention.

Finally, the magnetic circuit 7 is set at a position on the side of the coil at the back side of the carriage 6, for securing on the rigid frame 1. As shown in FIG. 4, the magnetic circuit 7 is constructed with an upper yoke 71, a bottom yoke 72 and a magnet 73. The upper yoke 71 and the bottom yoke 72 are combined by magnetic drawing force of the magnet 73. On the other hand, in the magnetic circuit 7, a stopper 74 defining motion range of the carriage 6 is inserted. The carriage 6 is restricted motion range by abutting against the stopper 74. So that the carriage 6 may be stably held at stand-by position after abutting the stopper 74, a latching magnet 75 is inserted. The latching magnet 75 generates a magnetic drawing force acting on a iron peak provided at a portion of the carriage 6 abutting on the stopper 74. Concerning holding of the carriage 6, there is typically employed inertia lock for locking in response to an impact force. While not illustrated in the drawings of the preferred embodiment of the present invention, it is desirable to provide such inertia lock in view of given importance for removing ability.

It should be noted that, in the shown embodiment, a construction for mounting the magnetic circuit 7 on the rigid frame. One of the purposes of mounting the major components on the rigid frame is to determine the relative heights of respective parts with high precision. In view of this, a precision required for the relative height relationship between the magnetic circuit 7 and the carriage 6 is not so height and is in the extent of ±0.1 mm. Therefor, it is also possible not to directly mount the rigid frame 1 to assemble in the DE after mounting.

Figure 5A:
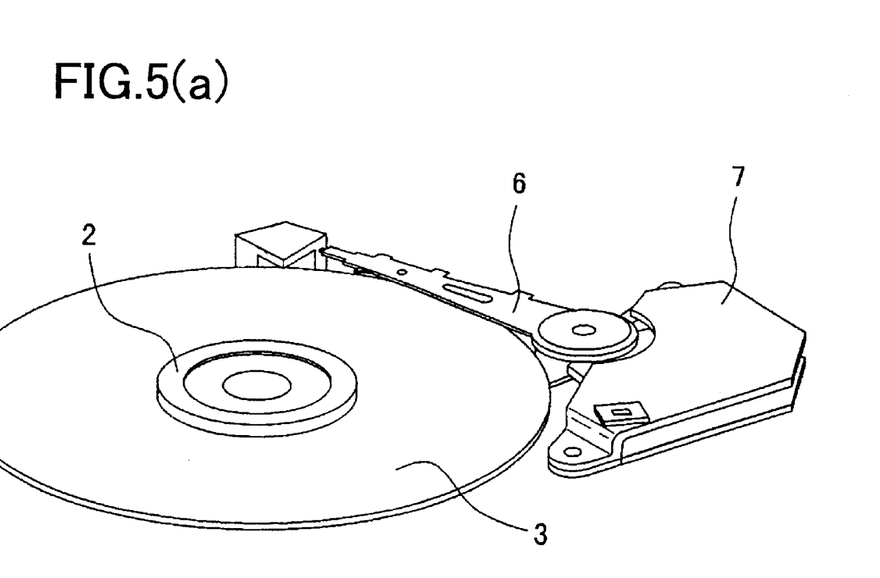
FIG. 5(a) is a perspective view of a magnetic disk and a carriage portion of the first embodiment of the magnetic disk drive unit as viewed from the above.
Figure 5B:
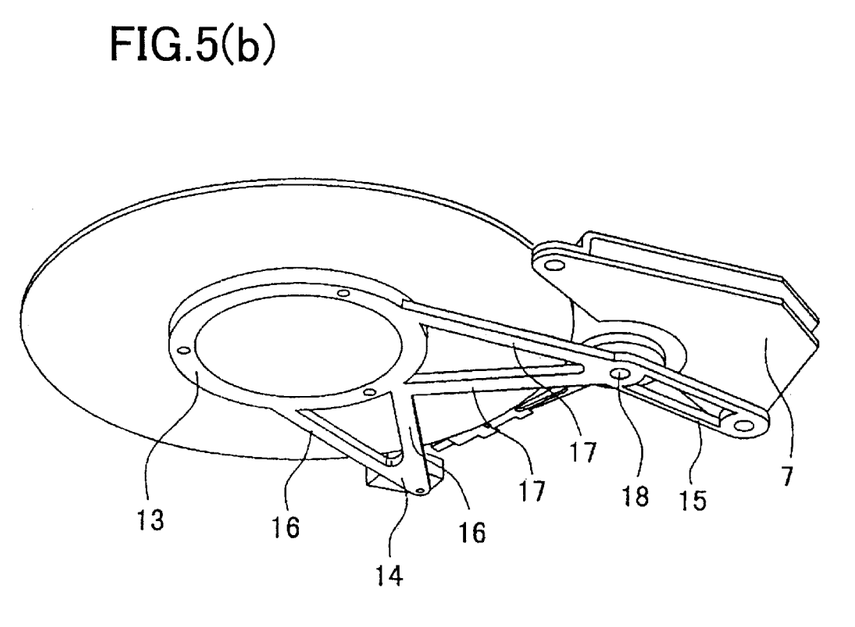
FIG. 5(b) is a perspective view of a magnetic disk and a carriage portion of the first embodiment of the magnetic disk drive unit as viewed from the below.

Assembling of the major components as the magnetic disk drive unit is completed. In production, it becomes possible to hold the assembly as goods in production. FIGS. 5(*a*) and 5(*b*) are perspective views of the assembly.

During the assembling process set forth above, it is important to precisely define relationship of heights of respective members set in the rigid frame 1. As set forth above, the relative height of the arm 62 mounting the magnetic head and a recording surface of the magnetic disk 3 and a relative height of the ramp 5 and the magnetic disk 3, and thus the relative height between the magnetic circuit 7 and a coil 63, and so forth should significantly influence for performance and reliability as the magnetic disk drive unit.

While precision of respective parts to be mounted, such as the spindle motor 2, the carriage 6 and so forth, the feature of the present invention is to form the base mounting those parts as flat single frame as common frame. The rigid frame 1 is punched from the metal plate and is cut-out the intermediate portion by wire cutting and so forth. Therefore, the rigid frame is one piece and flat shape with no bent portion or the like. Therefore, relatively high planar characteristics and flatness can be achieved and can be managed easily. Therefore, by preliminarily checking the dimensional relationship of the height of the reference plane for setting respective members, relative height of the parts after assembling can be strictly determined.

Conventionally, for the base member used in the magnetic disk drive unit, additional machining has been required for improving dimensional precision for the portion mounting the carriage, the motor, the ramp or the like. Therefore, machining process becomes complicate. Furthermore, since the base has complicate structure, management of precision was difficult.

According to the present invention, by employing the flat rigid frame 1, machining, assembling and management are facilitated by using the flat rigid frame 1 without degradation of quality in the prior art.

Next, discussion will be given for a structure as completed product of the magnetic disk drive unit and assembling process thereof.

Figure 6:
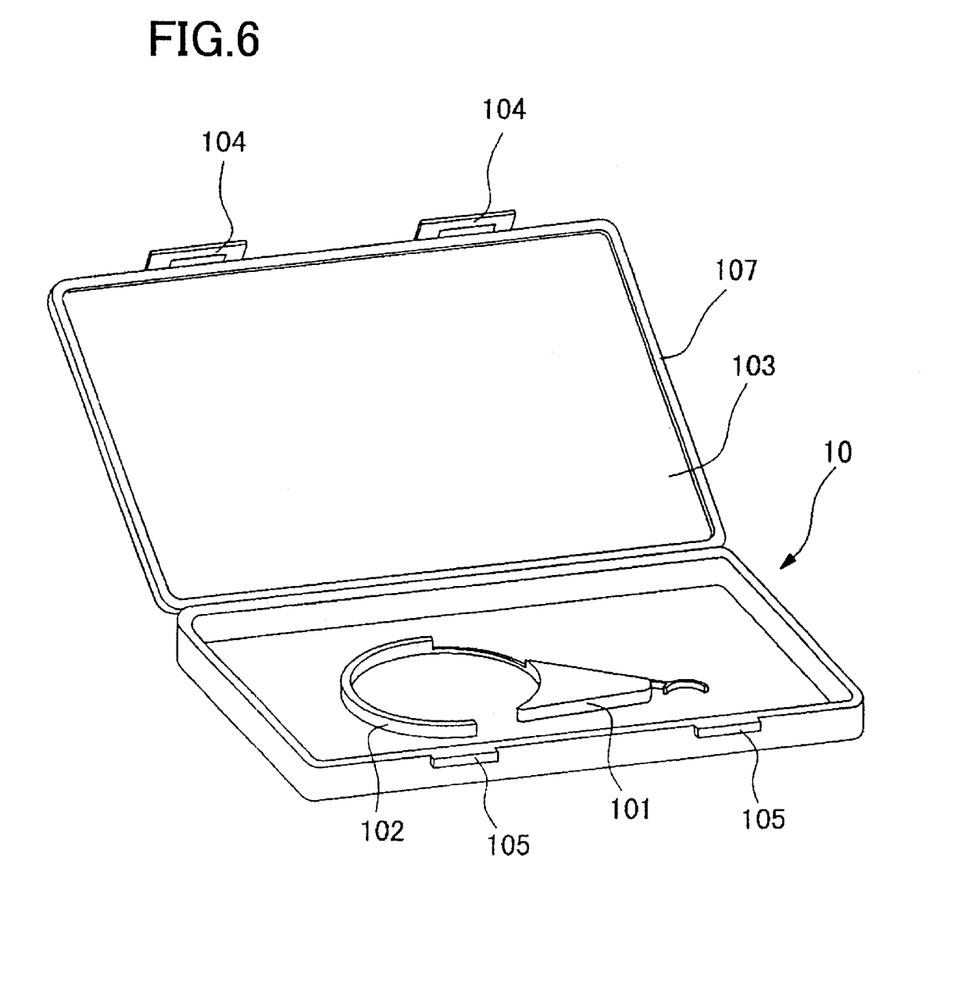
FIG. 6 is a perspective view of a casing.

One of the important features of the present invention is use of a casing 10 covering DE (disk enclosure). FIG. 6 is an external view of the casing 10.

The casing 10 is desirably formed of a resin for reduction of overall weight of the magnetic disk drive unit. On the other hand, when metal is used, metal having relatively small specific weight, such as magnesium or the like may be used in thin plate structure. In the shown embodiment of the present invention, polycarbonate resin having superior forming ability and low cost is used. The casing 10 can reduce weight in comparison with the conventional magnetic disk drive unit. More particularly, the aluminum base in the conventional magnetic disk drive unit is about 150 g and the cover of laminated damping steel sheet is about 100 g. Therefore, a total weight of the member covering DE becomes about 250 g. In contrast to this, the casing formed of polycarbonate of the present invention is 80.9 g, the weight of the rigid frame using the stainless steel plate for the rigid frame 1 is 17.5 g. Therefore, a structural body covering the DE in total is 98.4 g. Namely, the shown embodiment of the magnetic disk drive unit according to the present invention may have a weight of the housing less than or equal to half of the conventional magnetic disk drive unit.

Here, what can be a problem is rigidity of the casing per se. However, since the members of the carriage system and the spindle motor system which significantly influence for performance of the magnetic disk drive unit are all mounted on the touch and common rigid frame 1. Therefore, degradation of performance of the magnetic disk drive unit due to lack of rigidity of the casing 10 will never be caused.

Concerning assembling of the parts to the casing 10, a circuit package 9, on which electronic parts 91 (shown IC) is inserted in the bottom of the casing 10. On the back surface of the circuit package 9, an I/F connector 92 to be used for connection with an external device is provided. Only this portion is projected externally from the casing through a cut-out portion 106 of the casing 10. As a kind of connector, any of suitable type of connectors, including ATA type, SCSI type, IEEE 1394 type which is attracting attention for application for digital video recording in recent days.

Upon enclosing the circuit package 9 within the DE (disk enclosure), it is required to have high cleanliness of the circuit package 9. At first, upon completion of mounting of the electronic parts on the circuit package 9, it is desirable to provide UV (ultraviolet) coating for the soldered portion. UV coating is provided by applying small amount of acryl type UV adhesive and curing the UV adhesive by irradiation of UV beam. By this, scattering of corrosive element contained in solder can be successfully prevented. Next, ultrasonic washing using natural detergent is performed by a pure waster washer. By this, most of foreign matter depositing on the circuit package can be removed. At this condition, the package 9 is inserted into the casing 10.

Next, an assembly of the carriage 6 and the spindle motor 2 mounted on the rigid frame 1 is set in the casing 10. The assembly is fixed by engaging the rigid frame 1 into engaging projection provided in the casing 10. The engaging projection 101 is inserted and fitted into the cut-out portion 12 of the rigid frame 1. By annular engaging projection 102, outer periphery of an arc portion 13 of the rigid frame 1 to be a guide for mounting the spindle motor is held. Here, fixing of the rigid frame on the casing may be done by any method of screw, adhesive and so forth. In the shown embodiment of the present invention, slip-in method is employed. This is intended for reducing screw tightening step and detaching ability in consideration of recycling of the magnetic disk drive unit. In the slip-in method, using elasticity of plastic of the casing, metal is fixed by pressure fitting.

At the same time of slip-in, the flexible circuit board 8 mounted on the carriage 6 is connected to a reading and writing connector 93 of the circuit package. By this, recording and reproducing signal can be transmitted between the magnetic head and the circuit package.

One set of assembly mounted on the rigid frame 1 is fixed at the predetermined position of the casing 10. Then, the cover 103 of the casing 10 is closed and a clamp 104 formed integrally with the cover 103 of the casing 10 is engaged with a projection 105 with elastically deforming the clamp 104 for locking the cover 103 in the position closing the casing 10. It is also possible to lock the cover 103 in the position closing the casing 10 by means of screw or screws. However, in the embodiment of the present invention, in order to reduce process steps, clamp 104 is employed for better workability in enclosing the assembly therein. Also, the reason why locking of the casing by the screw is not required, is that the carriage 6, the spindle motor 2 and so forth are completely secured only on the rigid frame 1, and the casing 10 is not required to have a function as structural member. Therefore, strength of the overall unit does not rely on the strength of the casing.

In the conventional magnetic disk drive unit, the carriage, spindle motor and so forth are secured on the cover or base by means of screws. Therefore, connection between the cover and the base also becomes important factor for determining rigidity. For this reason, in the prior art, if soft connection is employed for connection between the cover and the base, performance of the magnetic disk drive unit can be degraded significantly. Therefore, permitting employment of only clamp in enclosing the cover is advantageous for realizing the rigid frame+casing construction according to the present invention.

It should be noted that DE has to be sealingly enclosed. This is intended to prevent penetration of foreign matter and to prevent the magnetic head from being damaged. In the shown embodiment of the present invention, a gasket 107 is provided on the cover 103 of the casing 10 to maintain the inside of the DE in sealed condition.

As a method for maintaining DE in sealed condition, without using the gasket, a system for establishing a seal of the lid of the casing 10 with elasticity of the cover, a structure for establishing a seal by elastically engaging the edge of the opening portion of the resin casing with a groove provided in a resin cover slightly softer than the casing (such as that seen in food storage container).

Finally, the magnetic disk drive unit according to the present invention as covered by the casing per se has sufficiently high impact resistance.

The conventional magnetic disk drive unit is covered with the metal, high impact acceleration in the extent of several thousands G should be caused upon falling down. In general, upon falling down from the desk surface to a tile floor, impact of 1000 G to 5000 G is caused. On the other hand, the carriage and the spindle motor as major part in the magnetic disk drive unit are fixed on the cover or base by means of screw, the impact generated upon falling down is exerted on the parts substantially as is. Therefore, the conventional magnetic disk drive is weak against the impact.

On the other hand, in order to make up the weak point set forth above, damping material is attached on the magnetic disk drive unit or dedicated carrying case is prepared for the purpose of shock absorption. However, these products should have large thickness. Furthermore, number of parts is inherently increased for measure for impact to encounter cost problem.

In the magnetic disk drive unit according to the present invention, as repeatedly discussed, the carriage 6, the spindle motor 2 and so forth are fixed on the resin casing 10 indirectly via the rigid frame 1. Therefore, substantial amount of impact force exerted on the magnetic disk drive unit, can be absorbed by elastic deformation of the casing 1 per se. Furthermore, since the rigid frame 1 and the casing 10 are connected by slip-in and not completely rigid securing, the impact force acting of the casing 10 is no easily transmitted to the carriage 6, the spindle motor 2 and so forth as major parts.

Next, modification of the foregoing embodiment of the magnetic disk drive unit according to the present invention will be discussed. In the foregoing embodiment, the rigid frame 1 and the spindle motor 2 are formed separately. However, it is also possible to make a stator portion of the spindle motor 2 in common with the rigid frame 1 to directly form the spindle motor on the rigid frame 1 in integral fashion.

On the other hand, in the foregoing embodiment, the ramp 5 located at the stand-by position of the head is fixed on the rigid frame 1, it may also be possible to form the head stand-by position by bending the rigid frame 1.

Also, in the foregoing embodiment, the casing 10 is formed with polycarbonate resin. However, such material is easily generate static electricity to be a cause of electrostatic break down of the MR head used in the magnetic disk drive unit. Therefore, it is possible to use a material, such as polycarbonate resin impregnated in conductive material. such as carbon or the like. For example, conductive Juracon and the like may be useful.

As set forth above, while measure for static electricity has to be taken in the casing 10, it may be possible to attach a thin conductive film, such as aluminum foil, conductive plastic sheet on the inner wall or outer wall of the casing 10 to make the later. Also, conductive material may be provided on the casing by aluminum vapor deposition, aluminum sputtering, application of conductive paint, spraying by conductive spray and so forth for making the casing difficult to be charged the electricity.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A magnetic disk drive unit comprising:
    a spindle motor mounting a magnetic disk;
    a carriage mounting a magnetic head for recording and reproduction;
    a park mechanism for placing said magnetic head retracted from said magnetic disk at stand-by state where recording and reproducing are not performed;
    a single rigid frame mounting said spindle motor, said carriage and said park mechanism thereon for forming an assembly;
    a casing housing and fixing said assembly, said casing being formed of an elastically deformable material.

2. A magnetic disk drive unit as set forth in claim 1, wherein said rigid frame is formed into flat, and said spindle motor, said carriage and said park mechanism are mounted on the common magnetic disk drive unit on the same plane of said rigid frame.

3. A magnetic disk drive unit as set forth in claim 2, wherein, for avoiding electronic parts from being externally exposed, a circuit package for controlling said magnetic disk drive unit is housed within said casing.

4. A magnetic disk drive unit as set forth in claim 2, wherein one of said rigid frame and said casing is formed with a projection and the other is provided with a recess or hold for accommodating said projection by elastic deformation of a part of said casing for securing said rigid frame within said casing.

5. A magnetic disk drive unit as set forth in claim 2, wherein said assembly is formed with said park mechanism is integrally formed with a part of said rigid frame for placing said magnetic head away from said magnetic disk in stand-by state while recording and reproduction is not performed, and whereby said rigid frame body is integral with said park mechanism.

6. A magnetic disk drive unit as set forth in claim 5, wherein one of said rigid frame and said casing is formed with a projection and the other is provided a recess or hole for accommodating said projection by elastic deformation of a part of said casing for securing said rigid frame within said casing.

7. A magnetic disk drive unit as set forth in claim 5, wherein, for avoiding electronic parts from externally exposed, a circuit package for controlling said magnetic disk drive unit is housed within said casing.

8. A magnetic disk drive unit as set forth in claim 5, wherein said casing is a molded resin body including a casing body arranged lower side of said assembly and a cover mating with said casing body for entirely covering said assembly, one of said casing body and said cover is provided with a projection and the other is provided with a recess or hole for establishing enclosing condition by engagement of said projection and recess or hole.

9. A magnetic disk drive unit as set forth in claim 2, wherein said rigid frame is formed from one piece metal plate with die cutting.

10. A magnetic disk drive unit as set forth in claim 9, wherein said assembly is formed with said park mechanism is integrally formed with a part of said rigid frame for placing said magnetic head away from said magnetic disk in stand-by state while recording and reproduction is not performed, and whereby said rigid frame body is integral with said park mechanism.

11. A magnetic disk drive unit as set forth in claim 9, wherein, for avoiding electronic parts from being externally exposed, a circuit package for controlling said magnetic disk drive unit is housed within said casing.

12. A magnetic disk drive unit as set forth in claim 9, wherein one of said rigid frame and said casing is formed with a projection and the other is provided with a recess or hold for accommodating said projection by elastic deformation of a part of said casing for securing said rigid frame within said casing.

13. A magnetic disk drive unit as set forth in claim 9, wherein said rigid frame forms a part of a stator housing of said spindle motor, and thus said rigid frame is integral with said spindle motor.

14. A magnetic disk drive unit as set forth in claim 13, wherein, for avoiding electronic parts from being externally exposed, a circuit package for controlling said magnetic disk drive unit is housed within said casing.

15. A magnetic disk drive unit as set forth in claim 1, wherein, for avoiding electronic parts from being externally exposed, a circuit package for controlling said magnetic disk drive unit is housed within said casing.

16. A magnetic disk drive unit as set forth in claim 1, wherein one of said rigid frame and said casing is formed with a projection and the other is provided with a recess or hole for accommodating said projection by elastic deformation of a part of said casing for securing said rigid frame within said casing.

17. A magnetic disk drive unit as set forth in claim 1, wherein said casing comprises a molded resin body including a casing body arranged on a lower side of said assembly and a cover mating with said casing body for entirely covering said assembly, one of said casing body and said cover is provided with a projection and the other is provided with a recess or hole for establishing condition by engagement of said projection and recess or hole.

18. A magnetic disk drive unit as set forth in claim 17, wherein said casing is attached a thin conductive member for preventing accumulation of static electric charge.

19. A magnetic disk drive unit as set forth in claim 17, wherein a conductive film is formed on the surface of said casing for preventing accumulation of static electric charge.

* * * * *